United States Patent [19]

O'Dell

[11] Patent Number: 5,313,912
[45] Date of Patent: May 24, 1994

[54] AQUARIUM HAVING SUBMERGED DRY DISPLAY AREA

[76] Inventor: Robert L. O'Dell, 2897 Pinyon, Apt. No. 1, Grand Junction, Colo. 81501

[21] Appl. No.: 991,487

[22] Filed: Dec. 11, 1992

[51] Int. Cl.⁵ .................................................. A01K 63/00
[52] U.S. Cl. ................................................ 119/246; 119/256
[58] Field of Search ................................................ 119/3, 5

[56] References Cited

U.S. PATENT DOCUMENTS

| D. 231,677 | 5/1974 | Miller | D30/8 |
|---|---|---|---|
| 660,782 | 10/1900 | Strumpell . | |
| 2,008,369 | 7/1935 | Staley | 119/5 X |
| 3,121,975 | 2/1964 | Duhamel | 47/17 |
| 3,269,578 | 8/1966 | Lewis | 220/4 |
| 3,929,101 | 12/1975 | Katz | 119/5 |
| 3,929,102 | 12/1975 | Suchowski et al. | 119/5 |
| 3,939,607 | 2/1976 | Spector | 47/17 X |
| 4,204,499 | 5/1980 | Leyva et al. | 119/5 |
| 4,958,593 | 9/1990 | Hulburt et al. | 119/5 |
| 5,031,572 | 7/1991 | Dana | 119/5 |
| 5,056,463 | 10/1991 | Wilkins et al. | 119/5 |

FOREIGN PATENT DOCUMENTS 345184 12/1989 European Pat. Off. ............... 119/3

Primary Examiner—Robert P. Swiatek
Attorney, Agent, or Firm—Richard C. Litman

[57] ABSTRACT

An aquarium accessory includes a clear dome which is set in place on the habitat floor. The dome has a side opening and at least one top orifice. Air from an aeration system bubbles into the dome through a floor opening, thus creating a dry zone in the dome. Amphibious animals can enter the dry zone and satisfy their need to leave the water periodically, while being confined within the aquarium and remaining fully visible to observers. Air escapes through the top orifice, enabling constant air exchange within the dome. Dry zone volume is varied by adjusting air flow from the aeration system. The dome includes an outwardly projecting flange which enables aquarium gravel to anchor the dome within the aquarium. The flange includes perforations sustaining water circulation, as for filtration, within the aquarium.

14 Claims, 3 Drawing Sheets

AQUARIUM HAVING SUBMERGED DRY DISPLAY AREA

BACKGROUND OF THE INVENTION

1. Field of the Invention

The present invention relates to an accessory for modifying the habitat of an aquarium, comprising an air filled dome providing an area having an air environment beneath water.

2. Description of the Prior Art

An owner of an aquarium frequently maintains amphibious animals, such as crustaceans, alive and on display in his or her aquarium. Such animals by nature periodically leave the water and remain on dry land. To satisfy this need, the animal may wander, and eventually escape the aquarium. Concurrently, the owner enjoys observing the animal, which observation may be obscured by water movement. Alternatively, observation of the animal on dry land may be rendered impossible for lack of a suitable dry area within the aquarium.

The closest prior art in this field has generally sought to juxtapose an aquarium and a terrarium. Examples are seen in U.S. Pat. No. 3,269,5578, issued to Robert B. Lewis on Aug. 30, 1966, U.S. Pat. No. 4,958,593, issued to James P. Hurlburt et al. on Sep. 25, 1990, and U.S. Pat. No. 5,056,463, issued to James F. Wilkins et al. on Oct. 15, 1991. Hurlburt et al. discloses an enclosed terrarium submerged within the water of an aquarium. Wilkins et al. provide a terrarium partially submerged in aquarium water, and open to and communicating with open atmosphere above the aquarium.

An aquarium comprising a dome open at the top and a peripheral base comprising an outwardly projecting flange is seen in U.S. Pat. No. 231,677, issued to Robert Erik Miller on May 21, 1974.

Inflatable domes are seen in U.S Pat. No. 3,121,975, issued to Eugene E. Duhamel on Feb. 25, 1964, and U.S. Pat. No. 3,939,607, issued to Donald Spector on Feb. 24, 1976.

An early example of a dome mounted on a radially outwardly projected flange is seen in U.S. Pat. No. 660,782, issued to Oscar Strumpell on Oct. 30, 1900. Strumpell includes a hole in the dome to facilitate filling, as with liquid. This hole is subsequently filled with a cement plug.

The prior art does not afford amphibious animals ready entry to and egress from a dry area of an aquarium, this dry are being submerged under aquarium water. None of the above inventions and patents, taken either singly or in combination, is seen to describe the instant invention, which provides the above mentioned advantages, as claimed.

SUMMARY OF THE INVENTION

The present invention provides a securely confined dry area which enables easy observation of an animal therein. A clear dome is set in place on the habitat floor. The dome has a side opening enabling animal entry and egress and at least one top orifice. Air from an aeration system bubbles into the dome through a floor opening, thus creating a dry zone in the dome. Animals can enter the dry zone and satisfy their need to leave the water periodically, while being confined within the aquarium and remaining fully visible to observers.

Air escapes through the top orifice, enabling constant air exchange within the dome. Dry zone volume is varied by adjusting air flow from the aeration system.

The dome includes an outwardly projecting flange which enables aquarium gravel to anchor the dome within the aquarium. The flange includes perforations sustaining water circulation, as for filtration, within the aquarium.

Accordingly, it is a principal object of the invention to provide a submerged dry display area within an aquarium.

It is an important object of the invention to provide a dry display area communicating with aquarium water, thus enabling an animal to enter and exit the dry display area.

It is a further object of the invention to provide a submerged dry display area including means to anchor the display area within the aquarium, as by weighting.

A still further object of the invention is to provide a submerged dry display area having means for anchoring the display area, which support surface does not obstruct aquarium water circulation.

Another object of the invention is to provide a substantially hemispherical submerged display area.

Still another object of the invention is to provide a submerged display area having a selectively variable volume dry zone.

An additional object of the invention is to provide a dry display area in which air is periodically replenished.

Yet another object of the invention is to provide a dry display area providing easy entry of air.

Still an additional object of the invention is to provide a dry display area having means to support objects therewithin, whereby a display is erected while the display area is out of the water and is subsequently placed in the aquarium.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
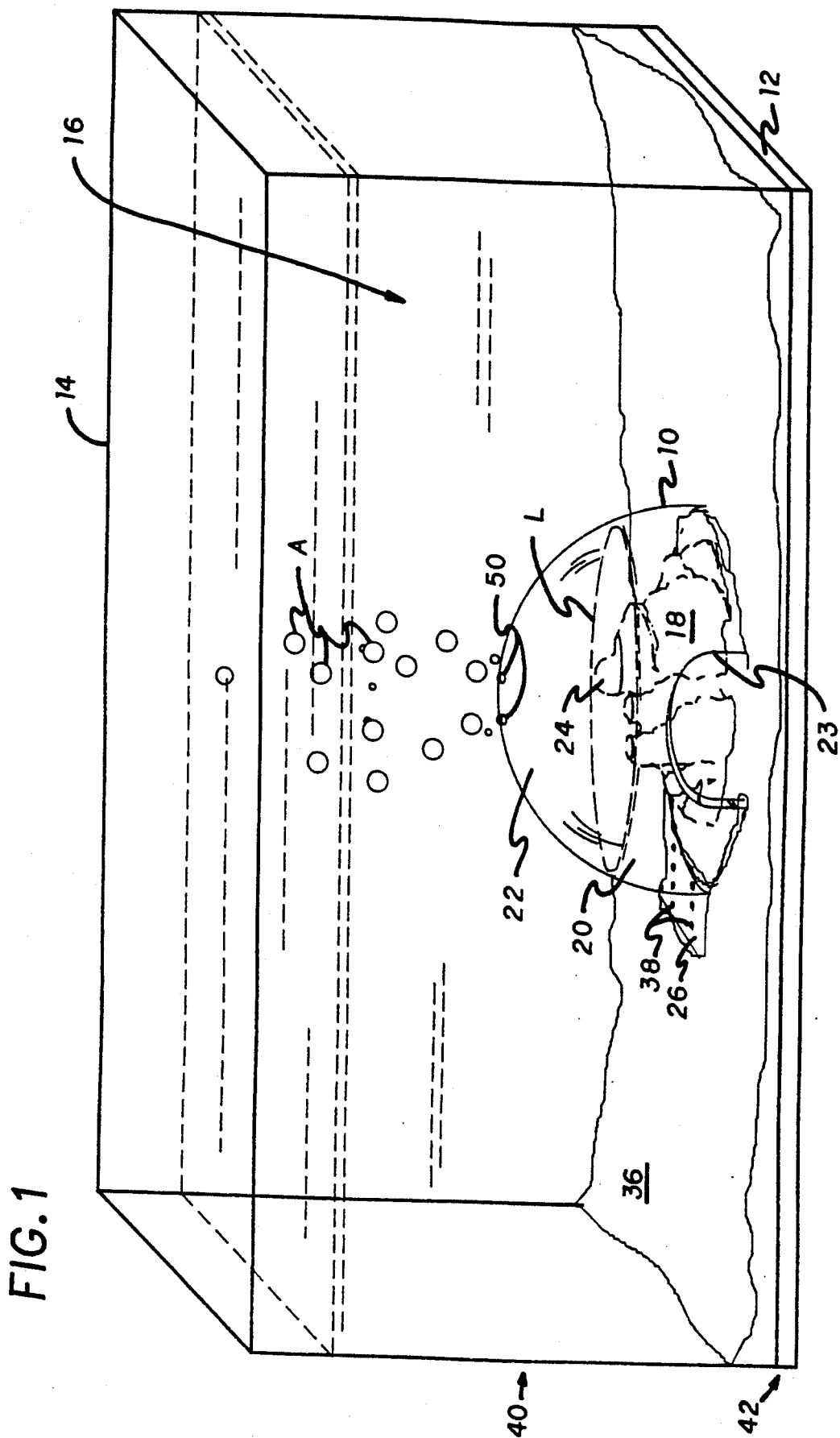
FIG. 1 is an environmental perspective view of the invention.

The present invention provides a securely confined dry area within an aquarium which enables easy observation of an amphibious animal (not shown) therein. As seen in FIG. 1, a substantially hemispherical member, or dome 10, is located above the floor 12 of aquarium 14. Typically, a display 16 simulating animal habitat is, created on the aquarium floor 12. This overall habitat display 16 is extended to within the interior of the dome 10, in this case the confined habitat display 18 taking the form of a rock pile on which an animal can climb.

Water W enters and partially fills the dome 10, thus defining a wet zone 20 and a dry zone 22 therein. An entry opening 23 is formed in the dome 10 which determines a minimal level L of water within dome 10, and further enables an animal to enter. Preferably, the habitat display 18 includes a portion extending above water level L within the dome 10. This provides a dry area 24 on which the animal can crawl and satisfy its periodic need to be out of water. While the animal is here, it is confined within the dome 10, but remains readily visible to an observer. The hemispherical shape of dome 10 facilitates unobstructed vision from any angle.

Figure 2:
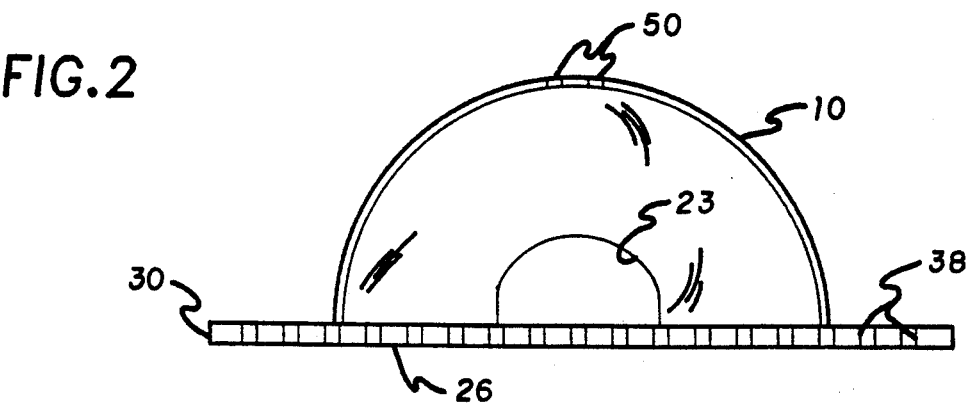
FIG. 2 is a side elevational view of the display dome.
Figure 3:
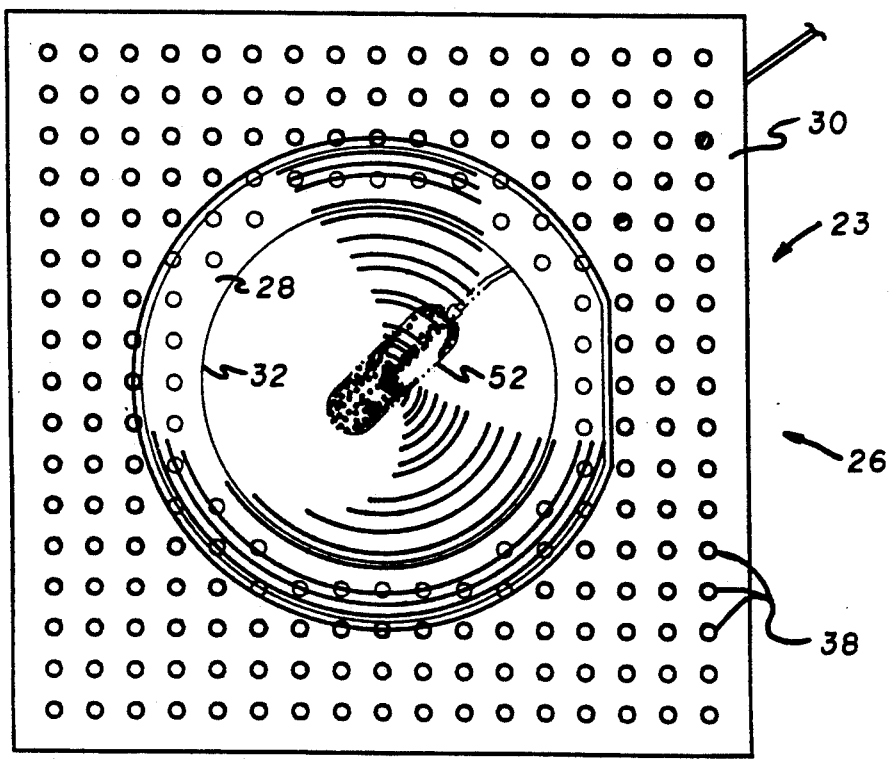
FIG. 3 is a top plan view of the display dome.

Turning now to FIGS. 2 and 3, structure of the dome 10 is seen further to include a base 26 comprising a floor portion 28 and a flange portion 30. The floor portion 28 extends below the dome 10, and has a central opening 32 providing access to the dome interior. Confined simulated habitat 18 or other structure, which provides a suitable platform on which an animal supports itself while out of the water, and from which location the animal is readily observed, is erected while the dome 10 is out of the water. The dome 10 is then placed in the aquarium 14, anchored and submerged.

The dome 10 is made from clear material, such as a clear plastic or glass.

Figure 4:
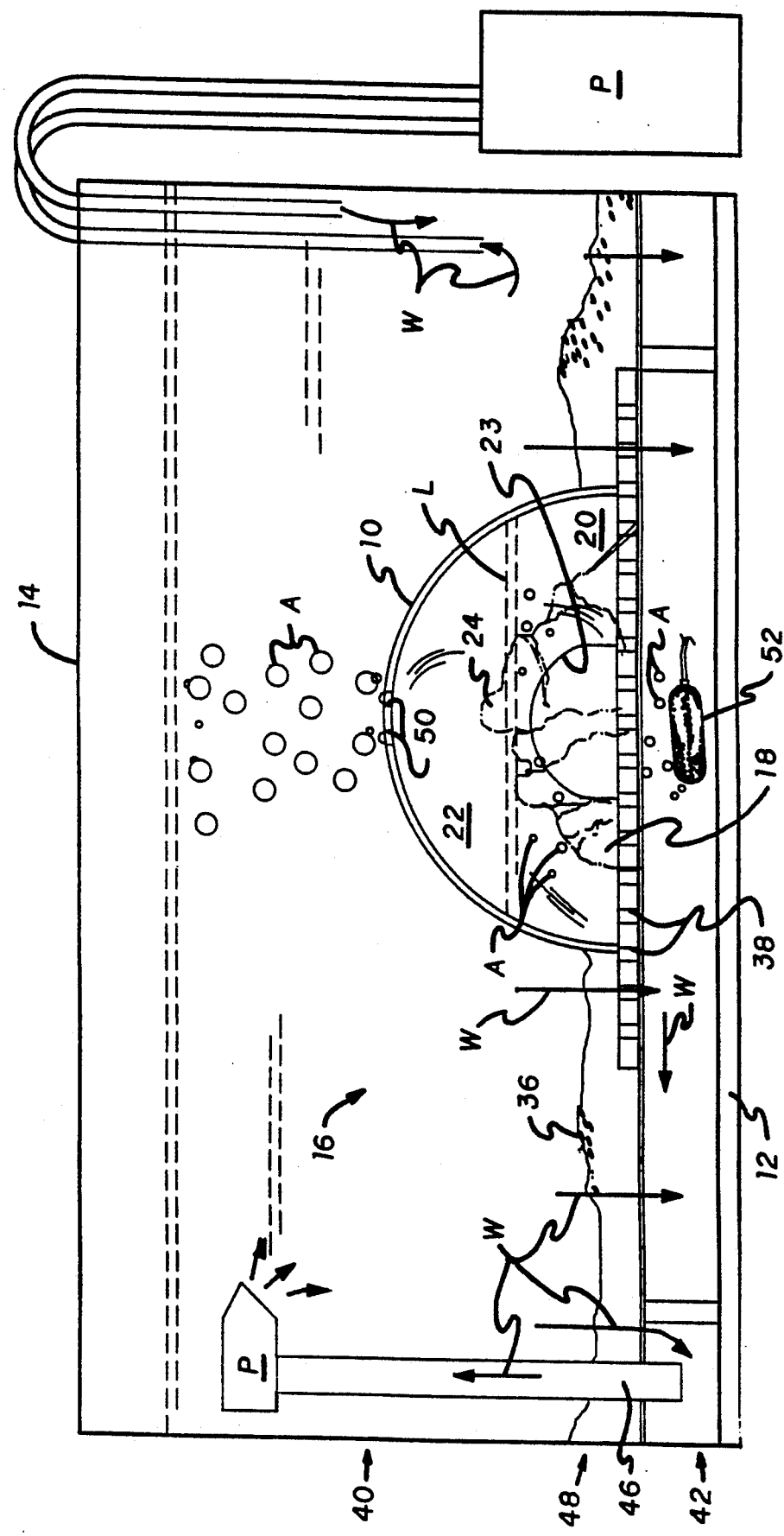
FIG. 4 is an environmental side elevational view of the invention.

Aquarium operation will now be discussed, with reference to FIG. 4. The flange portion 30 enables the dome 10 to be anchored at a preferred location within the aquarium 14 by weighting it down, as by covering the flange 30 with aquarium gravel 36. The dome 10 is thus anchored, only the viewing portion thereof being visible, the flange 30 thus not detracting from the aesthetic impression of the overall and confined habitat displays 16,18 created by the aquarium owner.

The flange 30 has perforations 38 which enable water W to circulate from a main tank area 40 to a lowermost area 42. The lowermost area 42 serves as a return conduit, enabling water W to flow to a pickup conduit 46 serving a pump P located thereabove. Pump P, there being either one or two pumps P, causes aquarium water W to flow through a filter. In some cases, aquarium gravel 36 forming a floor 48 of the the main tank area 40 provides a filtration medium, and, in such cases, it is desirable to enable water W to flow down all along the area of floor 12 to maintain effective filtration. Perforations 38 are therefore located along the entire flange 30.

Two small orifices 50 located at the top of the dome 10 enable air A to escape therefrom. When an air supply system (not shown in its entirety) is used to aerate the water W, an air stone 52 is placed beneath the dome floor central opening 32, and air A occupying the dome 10 is thereby periodically replenished.

As an air pump (not shown) can be an adjustable type as to air delivery rate, adjustment of delivery rate determines the volume of the dry zone 22. Variation of the dry zone 22 to establish a desirable degree of protrusion of habitat display 18 above water level W within the dome 10 is thereby enabled.

It is to be understood that the present invention is not limited to the sole embodiment described above, but encompasses any and all embodiments within the scope of the following claims.

I claim:

1. In an aquarium containing water, and being inhabited by amphibious animals, the improvement comprising:

a clear receptacle having lateral wall means defining a doorway therein and an interior thereof, said doorway communicating between aquarium water and said receptacle interior, said receptacle and said interior thereof being visible to an observer outside the aquarium, said receptacle further including a receptacle flange extending radially outwardly and configured so said receptacle is maintained in place in the aquarium by placing at least one object having weight on said receptacle flange, said receptacle flange exhibiting perforations and configured so water contained within the aquarium flows through said perforations;

whereby said receptacle is submerged in the aquarium water and partially fills therewith, thus defining a wet zone and a dry zone within said receptacle interior, each said zone having a volume, an amphibious animal thereby gaining access to said wet and dry zones through said doorway, and being visible while occupying said dry zone, the amphibious animal being confined within said receptacle.

2. The improvement according to claim 1, said receptacle being substantially hemispherical.

3. The improvement according to claim 1, said receptacle further including means defining an opening facing downwardly, whereby air readily enters said receptacle, thus providing said dry zone within said receptacle.

4. The improvement according to claim 3, further including air supply means for delivering air at a delivery rate into aquarium water below said receptacle downwardly facing opening, whereby said dry zone volume is filled with air and thus prevented from partially filling with water which water would reduce said dry zone volume.

5. The improvement according to claim 4, said receptacle including means defining at least one air escape hole, whereby air occupying said dry zone is replenished wit fresh air by said air supply means.

6. The improvement according to claim 4, said air supply means having adjustment means to vary said air delivery rate, whereby said dry zone volume is adjusted by increasing the amount of air contained therein.

7. The improvement according to claim 1, said receptacle having at least a floor defining an opening therein, whereby objects are placed in and supported on said floor, so a display may be assembled while said receptacle is out of the water and is subsequently placed in the aquarium and submerged in the aquarium water.

8. An aquarium accessory for providing habitat to amphibious animals in an aquarium containing water comprising:

a clear receptacle having lateral wall means defining a doorway therein and an interior thereof, said doorway communicating between aquarium water and said receptacle interior, said receptacle and said interior thereof being visible to an observer outside the aquarium, said receptacle further including a receptacle flange extending radially outwardly and configured so said receptacle is maintained in place in the aquarium by placing at least one object having weight on said receptacle flange, said receptacle flange exhibiting perforations and configured so water contained within the aquarium flows through said perforations;

whereby said receptacle is submerged in the aquarium water and partially fills therewith, thus defining a wet zone and a dry zone within said receptacle interior, each said zone having a volume, an amphibious animal thereby gaining access to said wet and dry zones through said doorway, and being visible while occupying said dry zone, the amphibious animal being confined within said receptacle.

9. The aquarium accessory according to claim 8, said receptacle being substantially hemispherical.

10. The aquarium accessory according to claim 8, said receptacle further defining an opening facing downwardly, whereby air readily enters said receptacle, thus providing said dry zone within said receptacle.

11. The aquarium accessory according to claim 10, further including air supply means for delivering air at a delivery rate into aquarium water below said receptacle downwardly facing opening, whereby said dry zone volume is filled with air and thus prevented from partially filling with water which would reduce said dry zone volume.

12. The aquarium accessory according to claim 11, said receptacle defining at least one air escape orifice, whereby air occupying said dry zone is replenished with fresh air by said air supply means.

13. The aquarium accessory according to claim 11, said air supply means having adjustment means for varying said air delivery rate, whereby said dry zone volume is adjusted by increasing the amount of air contained therein.

14. The aquarium accessory according to claim 8, said receptacle having at least a floor defining an opening therein, whereby objects are placed in and supported on said floor thus enabling a display to be assembled while said receptacle is out of the water and subsequently submerged in the aquarium water.

* * * * *